(No Model.) 2 Sheets—Sheet 1.

S. J. ARNOLD.
HORSE HAY RAKE.

No. 328,833. Patented Oct. 20, 1885.

WITNESSES
M. E. Fowler
E. G. Siggers

S. J. Arnold
INVENTOR
By C. A. Snow & Co.
Attorneys (No Model.) 2 Sheets—Sheet 2.
S. J. ARNOLD.
HORSE HAY RAKE.
No. 328,833. Patented Oct. 20, 1885.
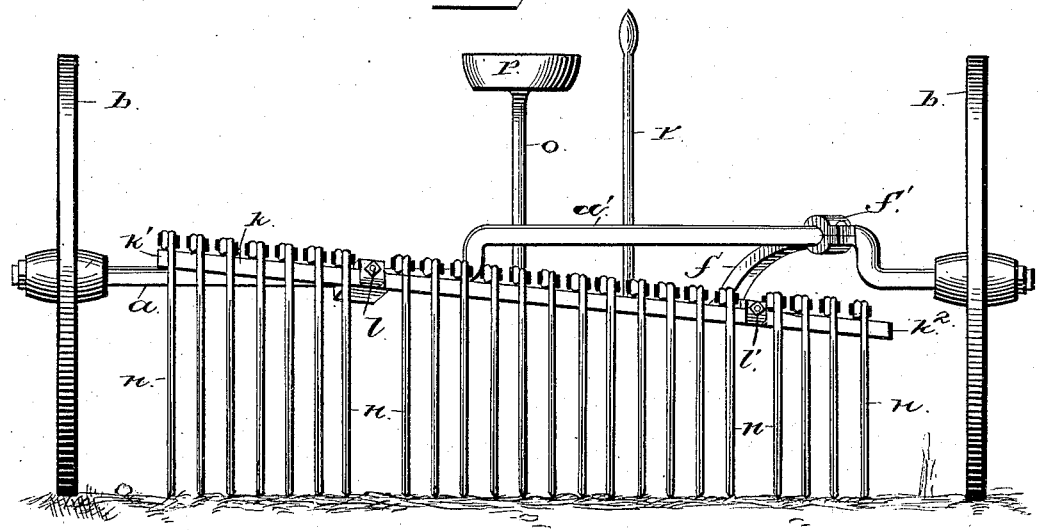
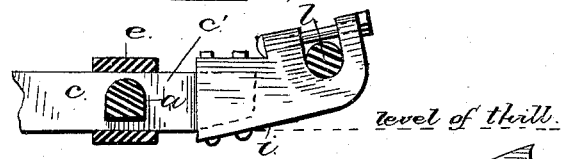
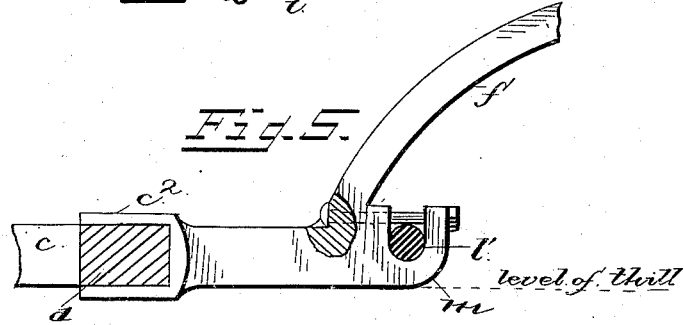
WITNESSES
M. E. Fowler
E. G. Diggets
S. J. Arnold
INVENTOR
By C. A. Snow & Co.
Attorneys

UNITED STATES PATENT OFFICE.

SAXTON J. ARNOLD, OF HUBBARDSTON, MASSACHUSETTS.

HORSE HAY-RAKE.

SPECIFICATION forming part of Letters Patent No. 328,833, dated October 20, 1885.

Application filed January 23, 1885. Serial No. 153,761. (No model.)

*To all whom it may concern:*

Be it known that I, SAXTON J. ARNOLD, a citizen of the United States, residing at Hubbardston, in the county of Worcester and State of Massachusetts, have invented a new and useful Improvement in Horse Hay-Rakes, of which the following is a specification, reference being had to the accompanying drawings.

My invention relates to an improvement in horse hay-rakes; and it consists in the combination of an axle having supporting-wheels journaled thereon, thills that are attached to the axle, and a rake-head that is attached to the thills at an angle to the axle; and it further consists in the peculiar construction and combination of devices, that will be more fully set forth hereinafter, and particularly pointed out in the claims.

The object of my invention is to provide a horse hay-rake that is adapted to rake the hay into windrows as the rake advances without dumping the rake, the operation being continuous.

Figure 1:
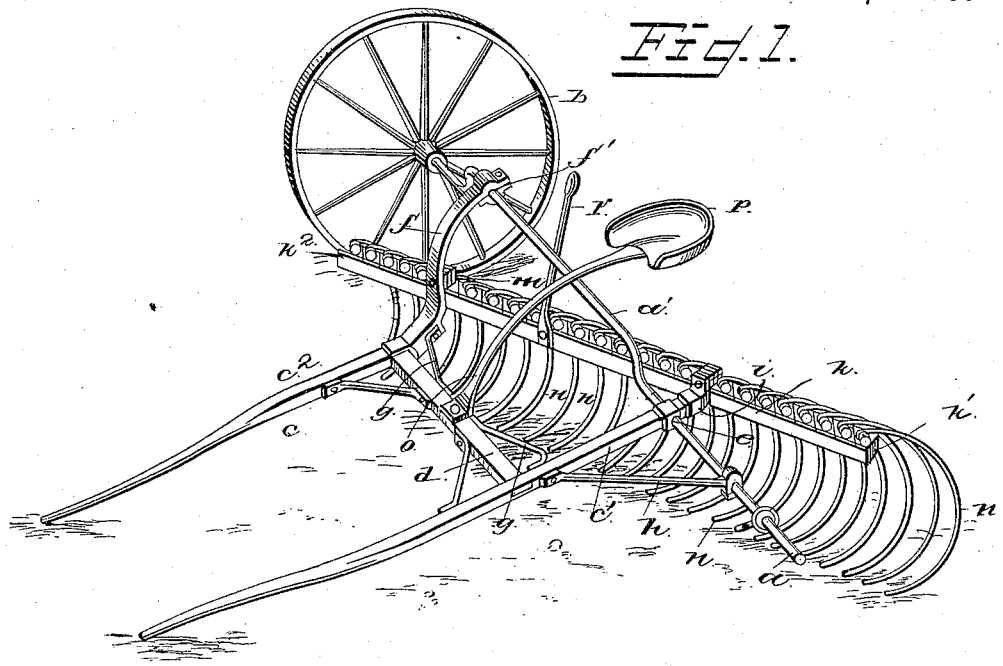
Figure 2:
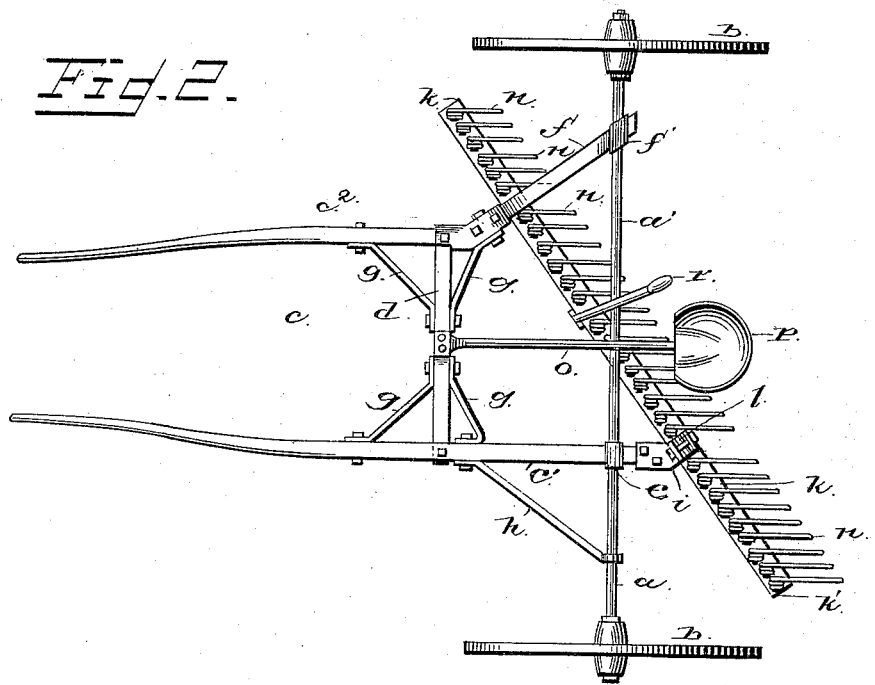

In the accompanying drawings, Figure 1 is a perspective of my invention. Fig. 2 is a top plan view. Fig. 3 is a rear elevation of the same. Figs. 4 and 5 are detail views.

Referring to the letters on the drawings, $a$ represents an axle, which is bent so as to have one portion, $a'$, higher than the remaining portions, and to the extremities of this axle are secured the wheels $b$.

$c$ represents thills, one of which, $c'$, extends rearwardly from the cross-bar $d$, and is secured to the axle, as at $e$. The other thill, $c^2$, has a metallic extension, $f$, attached to it immediately in rear of the cross-bar, and this extension $f$ curves upwardly, and is bent outwardly from the thills, and its outer extremity is secured to the raised portion of the axle, as at $f'$. Braces $g$ are bolted to the thills and to the cross-bar, and a brace, $h$, connects the straight thill $c'$ to the axle, as shown. To the rear end of this thill is bolted a bracket, $i$, which is bent upwardly, and in the rear end of this bracket is pivoted the rake-head $k$, as at $l$. A projection, $m$, is formed integrally with the extension $f$ on the under rear side thereof in the same horizontal plane with the thills, and this projection is adapted for a pivotal connection with the rake-head, as at $l'$.

By this construction it will be seen that the rake-head is secured to the thills at an angle to the axle and not parallel thereto, and as the bracket $i$ is bent upwardly that the rake-head is supported in a slightly inclined position, the end $k'$ being higher than the end $k^2$, as shown in Fig. 3. Curved spring rake-teeth $n$ are secured on the rake-head in the usual manner. These rake-teeth reach from the rake-head to the ground, and as the rake-head is slightly inclined from a horizontal position, as before set forth, it follows that the rake-teeth will be of slightly unequal lengths, those nearest the point $k'$ being longer than those nearest the point $k^2$.

To the center of the cross-bar $d$ is bolted a support, $o$, for the driver's seat $p$, and to the rake-head, on one side of said seat, is secured the lower end of the lever $r$, the function of which is to enable the driver to turn the rake-head in its bearings $l$ $l'$ when it is necessary to raise the rake-teeth above the ground for the purpose of avoiding an obstruction, or when the rake is in transportation and not in operation.

The operation of my invention is as follows: The rake is drawn along the field and the hay is caught by the rake-teeth, and owing to their being curved and to the angle at which the rake-head is placed with respect to the axle the hay is rolled up in front of the teeth and discharged therefrom at the point $k'$ as the rake advances, thus depositing the hay on one side of the rake in a continuous line parallel with the direction in which the rake is moving, and forming a windrow, as will be very readily understood.

The action of my rake is continuous, and there is no necessity for attention from the driver, other than to drive in a straight line and to lift the rake-teeth whenever necessary to do so in order to avoid an obstruction.

The escape end of the rake-head is raised higher than the opposite end in order to facilitate the passage of the hay therefrom.

Having thus described my invention, I claim—

1. In a horse hay-rake, the combination of the axle, the thills attached thereto, and the rake attached to the thills at an angle to the axle, substantially as described.

2. In a horse hay-rake, a rake-head secured at an angle to the axle and in an inclined position to the ground, substantially as described.

3. The combination of the axle, the thills attached to said axle, the rake pivoted to the thills at an angle to the axle, and a lever for tilting the rake for the purpose set forth, substantially as described.

In testimony that I claim the foregoing as my own I have hereto affixed my signature in presence of two witnesses.

SAXTON J. ARNOLD.

Witnesses:
JAMES A. STILES,
J. WALTER DAVIS.